J. E. BUXTON.
GRAIN-BINDER.

No. 191,928.

2 Sheets—Sheet 1.

Patented June 12, 1877.

Attest
P. McMickle.
J. W. Butterfield.

Inventor:
John E. Buxton
by L. Deane
Atty.

2 Sheets—Sheet 2.

J. E. BUXTON.
GRAIN-BINDER.

No. 191,928. Patented June 12, 1877.

Attest:
P. McNickle.
J. W. Butterfield

Inventor:
John E. Buxton
by L. Deane
atty.

UNITED STATES PATENT OFFICE.

JOHN E. BUXTON, OF OWATONNA, MINNESOTA.

IMPROVEMENT IN GRAIN-BINDERS.

Specification forming part of Letters Patent No. 191,928, dated June 12, 1877; application filed April 7, 1877.

*To all whom it may concern:*

Figure 1:
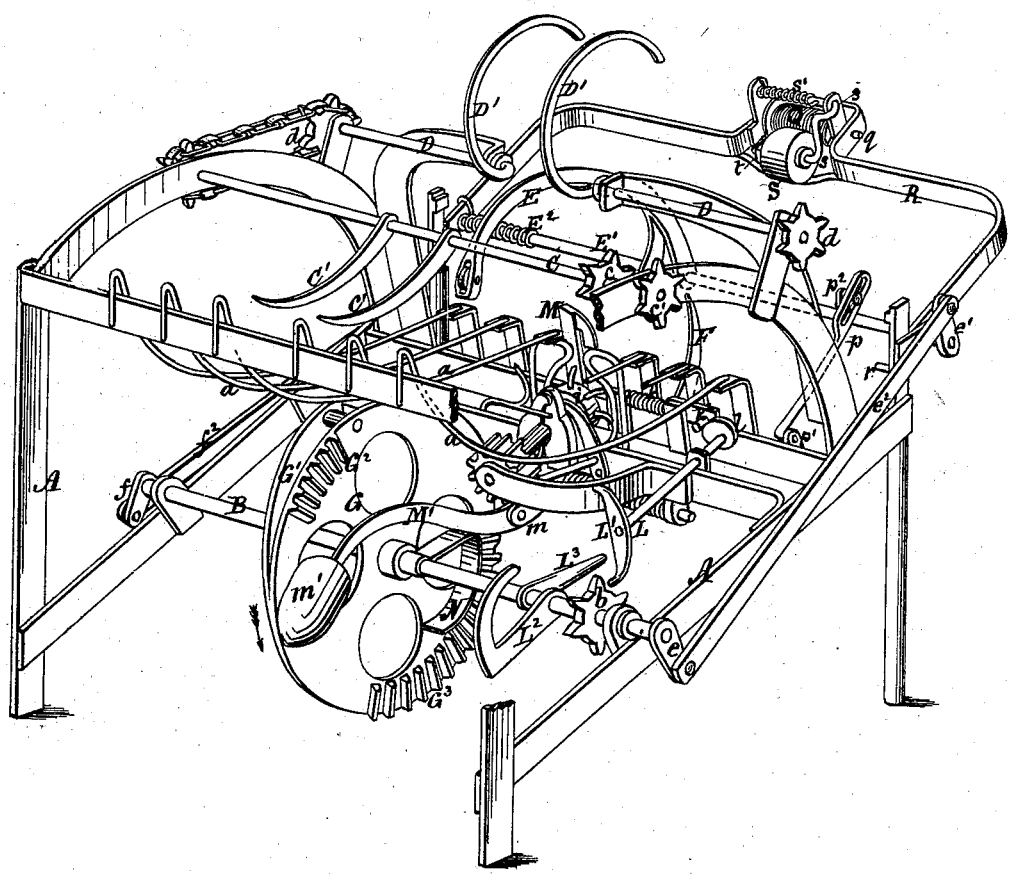
Figure 2:
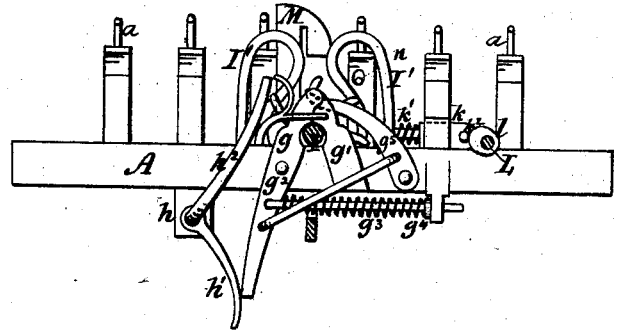
Figure 3:
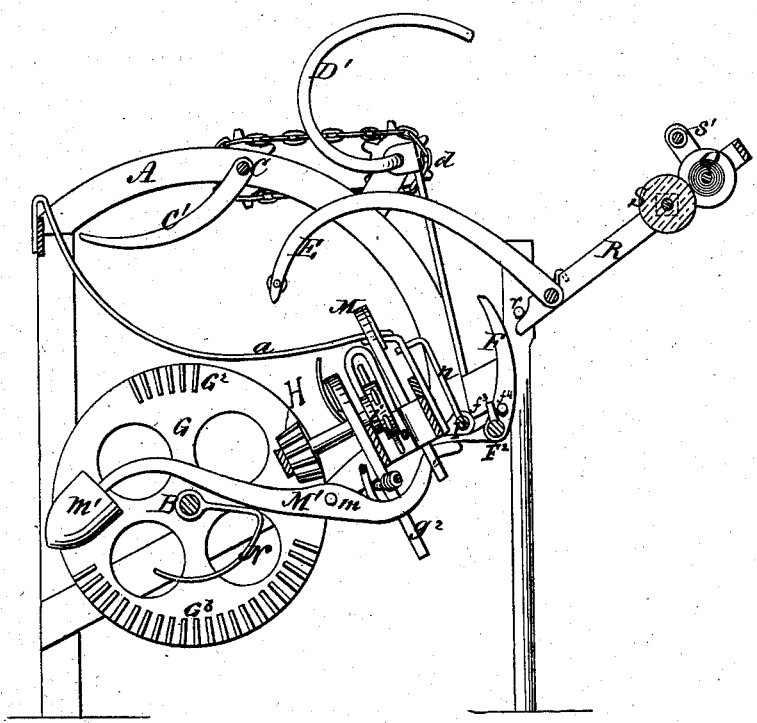
Figure 4:
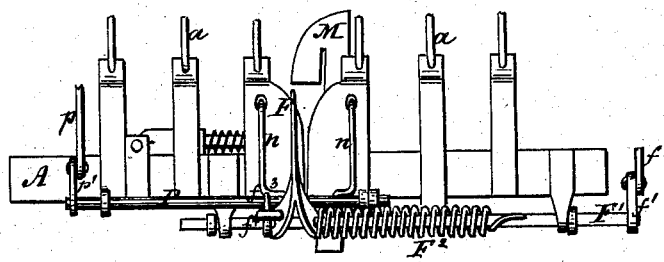

Be it known that I, JOHN E. BUXTON, of Owatonna, in the county of Steele and State of Minnesota, have invented certain new and useful Improvements in Grain - Binders, of which the following is a specification:

Figure 1 represents, in perspective, my grain-binding machine. Fig. 2 represents, in elevation, a portion of the machine, showing the nippers and guides used with the binding-wire. Fig. 3 represents a longitudinal vertical section of the machine. Fig. 4 represents a side view of the compressor and adjacent mechanism.

My invention relates to that class of grain-binding machines in which wire is used to bind the grain, and is to be employed in connection with harvesters in which the cut grain is received upon an endless apron, and elevated by means of canvas or belts, or any other suitable device, above the driving-wheel of the harvester, and comes down on the opposite side in a continuous stream, and is an improvement upon the machine described in the patent granted to me June 20, 1876.

My invention consists in providing a harvester-binder with a pair of bent arms, operated so as to preserve a clear space for the wire-carrying arm, and hold the bundle in the compressor; a vertically-sliding hook and its operating mechanism to retain the wire while it is twisted, and then cut off; a mechanism for removing the wire from the twisting-wheel, and discharging the bundle of grain; a mechanism for opening and closing the pinchers or nippers; a bent arm or bail, pivoted to the frame, controlled by a spring and carrying the spool of wire, said bail by its motion taking up the slack when the wire-arm is rising preparatory to encircling a new bundle; an adjustable compressing rubber roller to secure a uniform tension upon the wire while in use, all as will now be more fully described.

In the drawings, A denotes the frame of the machine; B, the main driving-shaft, carrying a sprocket-wheel, $b$, upon which a chain passes and transmits motion to another sprocket-wheel, $c$, upon the shaft C. The grain falling from a harvester is received in a continuous stream upon the wires or rods $a$, and advanced intermittently to the binding mechanism by the rotating arms $C'$ mounted upon the shaft C. This shaft transmits its motion by means of the sprocket-wheels $c$ $c'$, and chains passing over them, to the wheels $d$, mounted upon two short shafts, D, carrying two bent arms, D', that, in rotating, preserve a clear space for the wire-carrying arm E, and by their form force the bundle against the compressor F, and retain the bundle in position while encircling it with wire and tying it. For this purpose the outer portion of the arms D' is nearly concentric to the shafts D. The wire-carrying arm E is mounted upon a rock-shaft, $E^1$, and is operated from the main driving-shaft by the cranks $e$ and $e^1$ and connecting-rod $e^2$.

The compressor F is mounted loosely upon a rock-shaft, $F^1$, and is also operated from the main driving-shaft by cranks $f f^1$ and connecting-rod $f^2$. The pinchers are formed of two V-shaped jaws, $g$ and $g^1$. The jaw $g^1$ is stationary, but the jaw $g$, that carries the wire-cutter, is pivoted to the frame at $g^2$. It is retained in contact with the jaws $g^1$ by an expansion-spring, $g^3$, the tension of which can be regulated by washers $g^4$. The jaws are opened by a bell-crank lever pivoted to the frame at $h$. The lower end $h^1$ of said bell-crank rests against the lower end of the jaw $g$ and forces it open, when the cam $G^1$ upon the side of the mutilated gear-wheel G comes in contact with the upper end $h^2$ of the bell-crank. The wire-twisting wheel $i$ is provided with hooks or bent arms $i^1$ to carry the wire with it in its revolutions. It is mounted upon a shaft, I, carrying a pinion, H, and is operated intermittently by the mutilated gear G. During the operation the binding-wire is brought from the spool by the arm E between the guides $I^1$, over the twisting-wheel $i$, to the pinchers $g$ $g^1$. The wheel $i$ and its pinions H are then revolved half a revolution by the portion $G^2$ of the gear G and the gavel received by the compressor F. The extended wire is brought around it back to the pinchers or nippers $g$ $g^1$; but before being opened the first end of the binding-wire must be retained in contact with the twisting-wheel. This is accomplished by means of the horizontally-sliding clamp $k$ jamming the wire against a stationary rest. The clamp $k$ is most of the time retracted out of the way of the binding-wire by a spring, $k^1$, but when it is necessary to retain the binding-wire in position the clamp $k$ is advanced by a cam, $l$, acting against a pin or projection, $k^2$, of the clamp. The cam $l$ is mounted upon a shaft, L, provided with an arm, $L^1$, extending both below and above its center, and is operated by two levers, $L^2$ and $L^3$, mounted upon the main driving-shaft B, the lever $L^2$ forcing the clamp against the binding-wire, and the lever $L^3$ releasing it with the help of the spring $k^1$. When the two ends of the binding-wire have been received by the pinchers, the vertically-sliding hook M is depressed over the upper end of the wire (so as to bring the two ends close together adjacent to the bundle before being twisted) by means of the lever M' pivoted to the frame at $m$. This lever is depressed at the end where it is connected to the hook M by having its opposite end lifted by the cam N attached to the main driving-shaft B. At the same time the geared portion $G^3$ of the mutilated gear G operates upon the pinion H and revolves it two or three times, and twists the two ends of the wire together that number of times. After the cam N has passed its highest point the weight $m'$ brings one end of the lever M' down, while the opposite end is raised, and with it the hook M, out of contact with the binding-wire. Said wire is then released by the pinchers as they are opened, by the cam $G^1$ bearing against the end $h^2$ of the bell-crank lever, while the end $h^1$ bears against the lower end of the jaw $g$. The same motion lifts the bent lever $g^5$ and removes the wire from between the jaws in case it should stick there. The compressor F is then depressed by the partial rotation of its rock-shaft $F^1$ operated by the cranks $f f^1$ and connecting-rod $f^2$, as before mentioned, and by the pin or projection $f^3$ upon the shaft $F^1$ bearing against the pin $f^4$ upon the side of the compressor. When the compressor is not depressed in this manner it is forced against the bundle by a coiled spring, $F^2$, attached to it and to the shaft F, upon which it is placed.

When the bundle has been released by the compressor it is forced out of the machine by the rods $n$ attached to the rock-shaft P, which is operated from the rock-shaft $E^1$ of the wire-carrying arm E by means of a slotted connecting-rod, $p$, and crank $p^1$ and $p^2$. The spool of wire Q can rotate around a shaft, $q$, mounted upon the middle portion of the bent arm or bail R, that is pivoted to the rock-shaft $E^1$, so as to take up the slack wire by its own weight, assisted by the coiled spring $E^2$. When the wire-arm is rising preparatory to receiving a new bundle upon its wire, the bail R is kept from turning too far down by resting its extremities against pin $r$ attached to the frame. To secure uniform tension to the binding-wire, it is controlled by a rubber spring-roller, S, mounted upon one end of a crooked rod, $s$, carrying a coiled spring, $s^1$, that forces said roller against the spool of wire. The revolving motion of the rubber roller is also controlled by means of jam-nuts $t$, forcing a washer against one end of the said rubber roller.

Having thus fully described my invention, what I claim is—

1. In a grain-binding machine, the arms D' mounted upon independent shafts, and rotating upon each side of the wire-arm to preserve a clear space for said arm, and so bent as to have their outer ends concentric, or nearly so, with their shafts, to hold the bundle against the compressor, substantially in the manner described.

2. In a grain-binding machine, the vertically-sliding hook M, to carry down the upper end of the wire, and hold it with the lower end, until it is cut off and twisted, by means of its operating lever and cam, and raised to its normal position by the weight $m'$, substantially as and for the purposes described.

3. The rods $n$ attached to the rock-shaft P, in combination with rock-shaft $E^1$, and slotted connecting-rod $p$, for removing the binding-wire from the twisting-wheel, and discharging the bundle of grain, substantially as described.

4. The bent arm or bail R, pivoted to the opposite sides of the frame, controlled by a spring that forces it away from the arm E, and carrying the spool of wire, said bail by its operation taking up the slack of the binding-wire, substantially in the manner described.

5. In a grain-binding machine, an adjustable pressure-controlling rubber roller, in combination with spring $s'$ and wire spool, to secure a uniform tension upon the wire, substantially in the manner described.

In testimony that I claim the foregoing as my own I affix my signature in presence of two witnesses.

JOHN E. BUXTON.

Witnesses:
J. M. BURLINGAME,
N. M. DONALDSON.